United States Patent
Furuhashi

(10) Patent No.: US 10,847,182 B2
(45) Date of Patent: Nov. 24, 2020

(54) MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Takao Furuhashi, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/567,990

(22) Filed: Sep. 11, 2019

(65) Prior Publication Data
US 2020/0302967 A1    Sep. 24, 2020

(30) Foreign Application Priority Data

Mar. 18, 2019 (JP) .................. 2019-049910
Aug. 26, 2019 (JP) .................. 2019-153707

(51) Int. Cl.
*G11B 5/02* (2006.01)
*G11B 20/10* (2006.01)
*G11B 5/012* (2006.01)

(52) U.S. Cl.
CPC ........ *G11B 20/10027* (2013.01); *G11B 5/012* (2013.01)

(58) Field of Classification Search
CPC ........... G11B 27/36; G11B 5/09; G11B 20/10; G11B 20/0013; G11B 5/00; G11B 5/02; G11B 20/10027

USPC ............... 360/31, 39, 46, 55, 67, 68
See application file for complete search history.

(56) References Cited

U.S. PATENT DOCUMENTS

| | | | |
|---|---|---|---|
| 6,693,760 B1* | 2/2004 | Krounbi | G11B 5/024 360/51 |
| 6,980,382 B2 | 12/2005 | Hirano et al. | |
| 7,106,534 B2 | 9/2006 | Yoshida et al. | |
| 8,760,794 B1 | 6/2014 | Coker et al. | |
| 8,767,341 B1 | 7/2014 | Coker et al. | |
| 10,020,017 B2 | 7/2018 | Furuhashi | |
| 2016/0035383 A1* | 2/2016 | Tagami | G11B 5/02 369/13.26 |
| 2020/0020357 A1* | 1/2020 | Dunn | G06F 12/10 |

FOREIGN PATENT DOCUMENTS

JP    2011-8880 A    1/2011

* cited by examiner

*Primary Examiner* — Nabil Z Hindi
(74) *Attorney, Agent, or Firm* — White & Case LLP

(57) ABSTRACT

According to one embodiment, a magnetic disk device includes a magnetic disk section and a control section. The magnetic disk section includes a magnetic disk, a magnetic head, and a preamplifier. The control section included a processing section configured to cause the preamplifier to execute processing of generating the recording current used by a write head to write data to the magnetic disk, and processing of receiving an output reproduced from the magnetic disk by a read head, and configured to control the magnetic disk section. In the preamplifier, processing of reading data from the magnetic disk is executed by the read head in parallel with processing of writing data transferred from the control section to the magnetic disk by means of the write head.

16 Claims, 14 Drawing Sheets

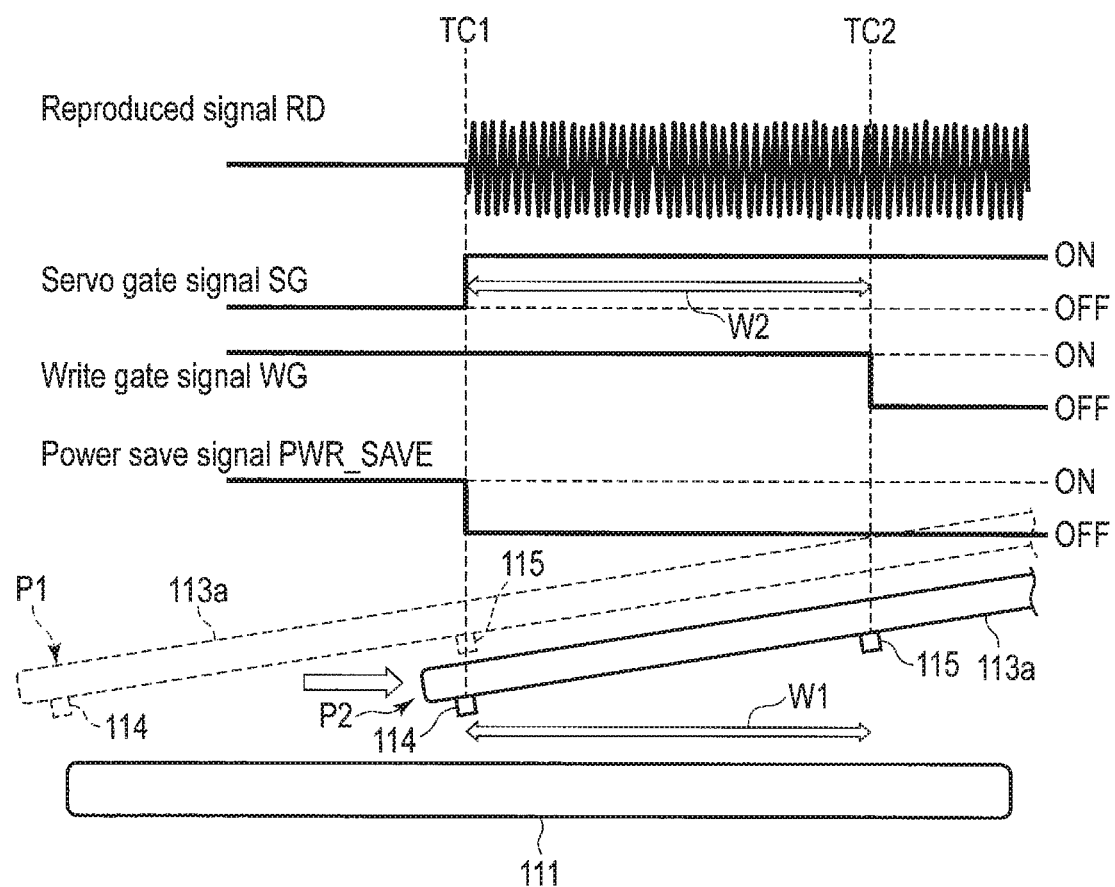
F I G. 4

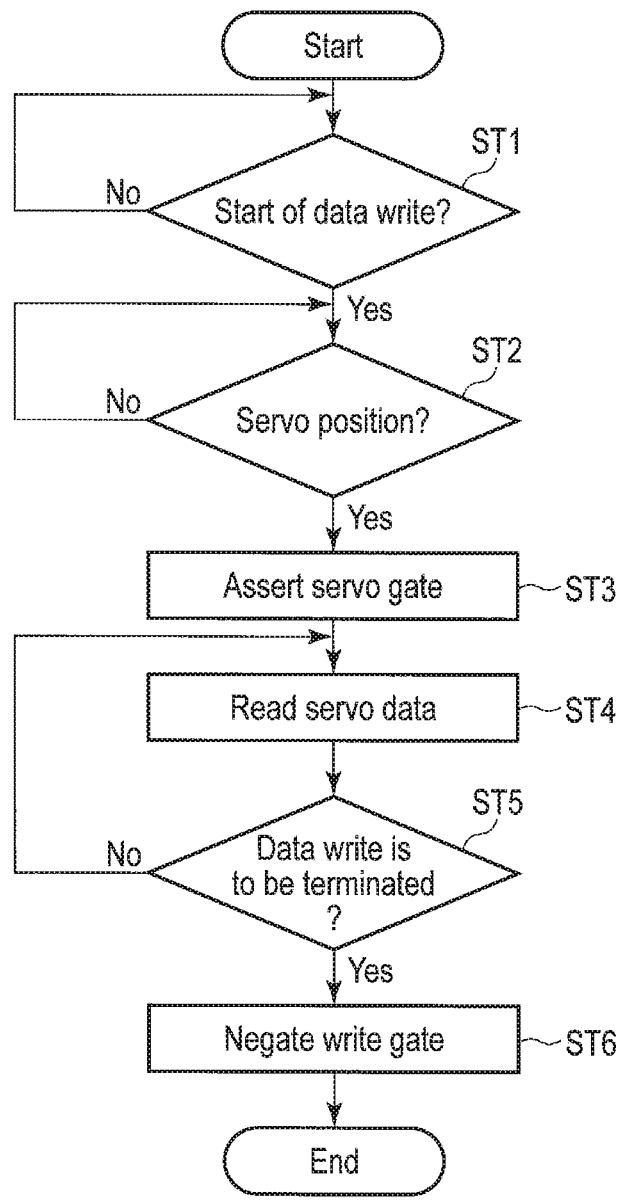
F I G. 5

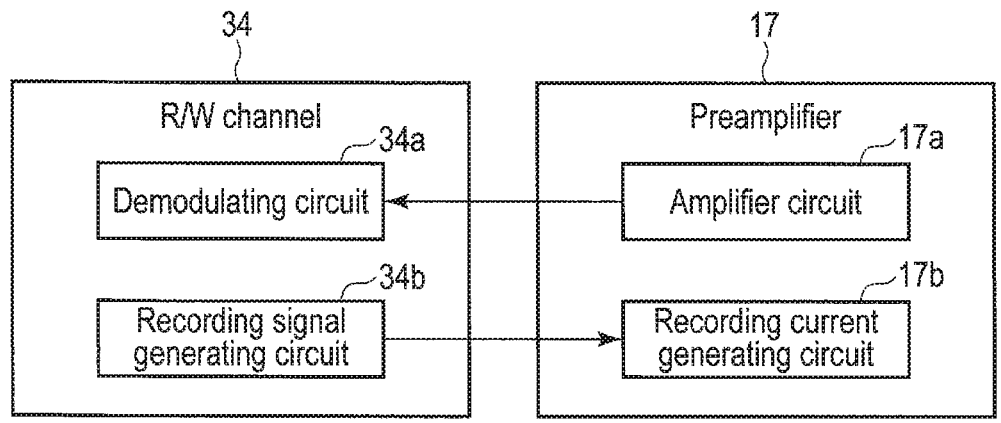
F I G. 9
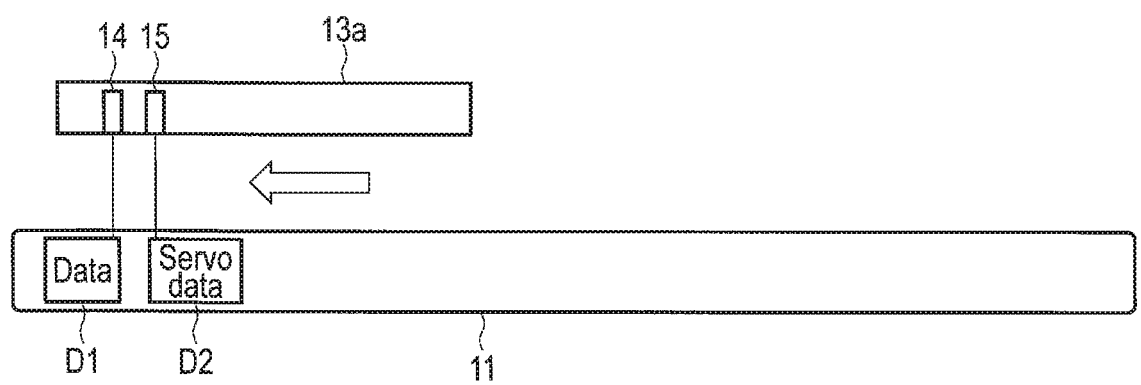
F I G. 10

MAGNETIC DISK DEVICE

CROSS-REFERENCE TO RELATED APPLICATIONS

This application is based upon and claims the benefit of priority from Japanese Patent Applications No. 2019-049910, filed Mar. 18, 2019; and No. 2019-153707, field Aug. 26, 2019, the entire contents of all of which are incorporated herein by reference.

FIELD

Embodiments described herein relate generally to a magnetic disk device.

BACKGROUND

Read/write of a magnetic disk device is carried by a magnetic head. In this magnetic head, a read head configured to read data from a magnetic disk and write head configured to write data to the magnetic disk are included. The read head and write head are arranged in such a manner that the read head and write head are shifted from each other in the rotational direction of the magnetic disk and separate from each other by a predetermined distance. Here, even when data is written to the magnetic disk by the write head, it is necessary to read servo data from the magnetic disk by the read head, and hence in general, write of data is stopped before read of data is started. For this reason, an area which cannot be used as a data area exists.

Embodiments described herein aim to provide a magnetic disk device capable of extending a data area.

BRIEF DESCRIPTION OF THE DRAWINGS

FIG. 4 is a view for explaining extension processing of a data area according to the first embodiment.

FIG. 5 is a flowchart showing an example of the extension processing of a data area according to the first embodiment.

FIG. 9 is a view showing an example of the configuration of each of an R/W channel and a preamplifier according to the second embodiment.

FIG. 10 is a view showing an example of a relationship between a magnetic head and data recorded on a magnetic disk in the second embodiment.

DETAILED DESCRIPTION

Figure 1:
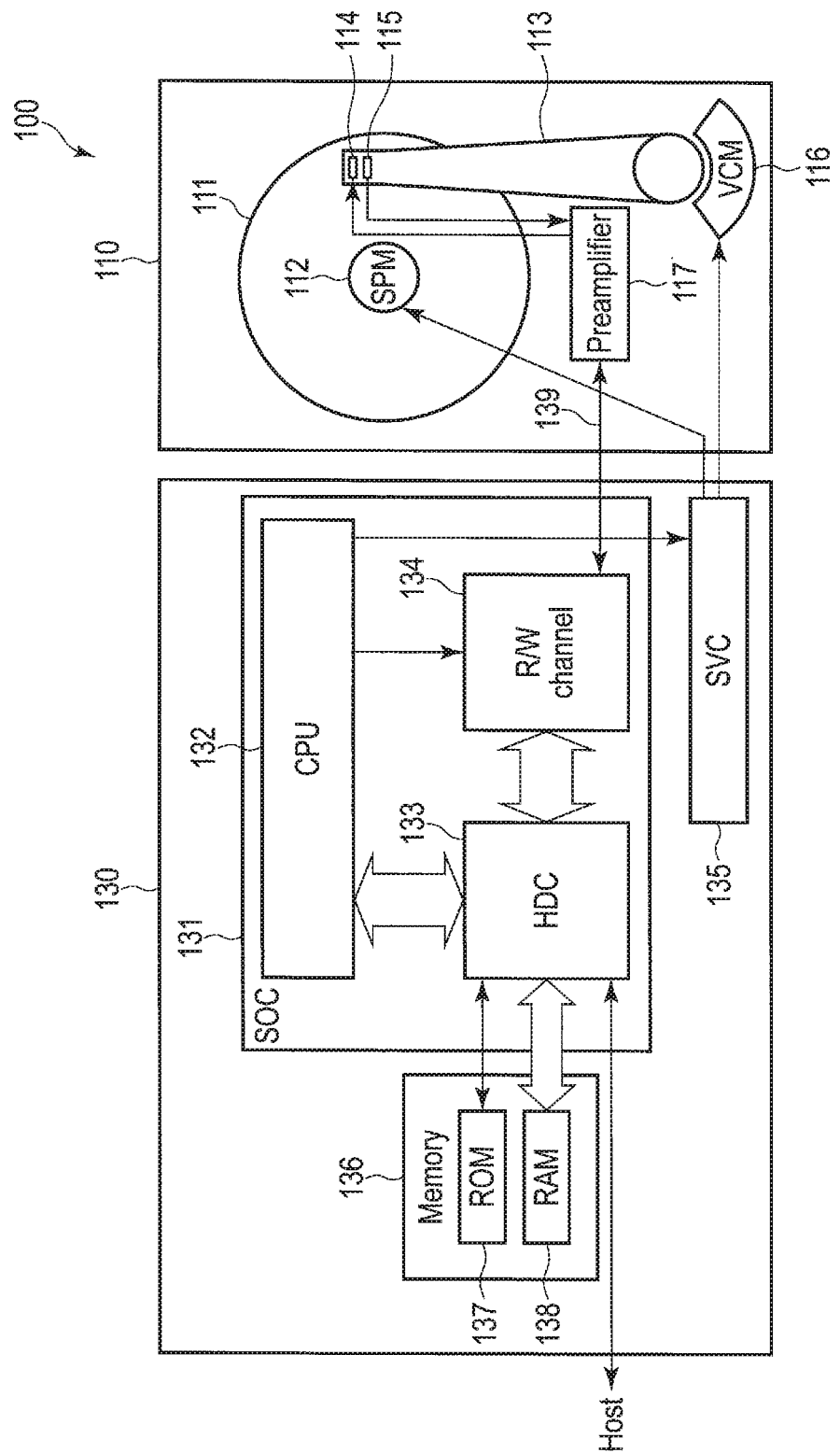
FIG. 1 is a view showing an example of the schematic configuration of a magnetic disk device according to the first embodiment of the present invention.

In general, according to one embodiment, a magnetic disk device includes a magnetic disk section and a control section. The magnetic disk section including a magnetic disk, a magnetic head including a write head, and a read head arranged at a position separate from the write head by a predetermined distance in a rotational direction of the magnetic disk, and a preamplifier including a first circuit configured to generate a recording current used by the write head to write data to the magnetic disk, and a second circuit configured to amplify a signal reproduced from the magnetic disk by the read head. The control section including a processing section configured to cause the preamplifier to execute processing of generating the recording current used by the write head to write data to the magnetic disk, and processing of receiving an output reproduced from the magnetic disk by the read head, and configured to control the magnetic disk section. In the preamplifier, processing of reading data from the magnetic disk is executed by the read head in parallel with processing of writing data transferred from the control section to the magnetic disk by means of the write head.

Hereinafter, embodiments will be described with reference to the accompanying drawings. It should be noted that the disclosure has been presented by way of example only, and the contents described in the following embodiments are not intended to limit the scope of the invention. Modifications readily occur to those skilled in the art are naturally included in the scope of the disclosure. In order to make the description more definite, the size, shape, and the like of each section are schematically expressed in the drawings by changing them from the actual embodiment in some cases. In a plurality of drawings, corresponding elements are denoted by identical reference numbers, and detailed descriptions are omitted in some cases.

First Embodiment

FIG. 1 is a view showing an example of the schematic configuration of a magnetic disk device 100.

As shown in FIG. 1, the magnetic disk device 100 is provided with a disk section 110 and a control section 130. The disk section 110 is provided with a magnetic disk 111, a spindle motor (hereinafter referred to as an "SPM") 112, a magnetic head 113, a voice coil motor (hereinafter referred to as a "VCM") 116, and a preamplifier 117. The magnetic head 113 includes a write head 114 and a read head 115. Further, the control section 130 is provided with a System on Chip (hereinafter referred to as an "SOC") 131, a servo combo (hereinafter referred to as an "SVC") 135, and a memory 136. The SOC (control section) 131 is constituted of a CPU 132, a hard disk controller (hereinafter referred to as an "HDC") 133, and a read/write (R/W) channel 134 serving as a processing section all of which are provided on one chip. The memory 136 is provided with a ROM 137 and a RAM 138. Further, the preamplifier 117 and the R/W channel 134 are connected to each other by a plurality of signal lines 139 including a power save signal line used to set active/power save of a signal read by the read head 115. It should be noted that an instruction as to active/power save of a power save signal is transmitted from the HDC 133 to the preamplifier 117 through the R/W channel 134.

The magnetic disk 111 includes a substrate formed into, for example, a disk-like shape and constituted of a non-magnetic material. In each surface of the substrate, a soft magnetic layer constituted of a material exhibiting a soft magnetic property and serving as a foundation layer, a magnetic recording layer having a magnetic anisotropy in the direction perpendicular to the disk surface and formed on the soft magnetic layer, and a protective film layer formed on the magnetic recording layer are stacked one on top of the other in the order mentioned. Here, the direction to the magnetic head 113 is defined as the direction to the upper layer.

The magnetic disk 111 is fixed to the spindle motor (SPM) 112 and is rotated by the SPM 12 at a predetermined rotational speed. It should be noted that the number of the magnetic disk 111 is not limited to one, and a plurality of magnetic disks 111 may be provided on the SPM 112. The SPM 112 is driven by a drive current (or a drive voltage) supplied thereto from the SVC 135.

Figure 3:
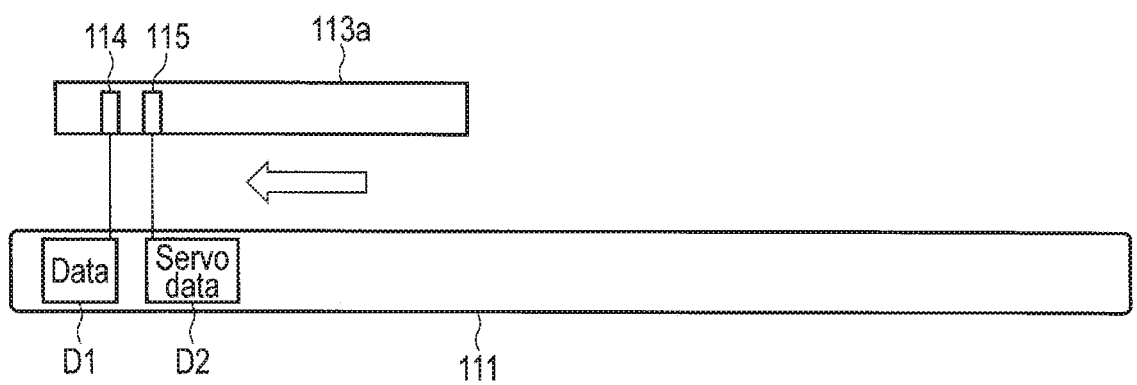
FIG. 3 is a view showing an example of a relationship between a magnetic head and data recorded on a magnetic disk in the first embodiment.

The magnetic head 113 is provided with a slider 113a at a tip end part thereof, and includes the write head 114 and the read head 115 formed on the slider 113a (see FIG. 3). Regarding the magnetic head 113, a plurality of magnetic heads 113 are provided according to the number of the magnetic disks 111.

On the VCM 116, an actuator including the magnetic head 113 at a tip end part thereof is rotatably provided. The actuator is rotated by the VCM 116, whereby the magnetic head 113 is moved to a position on the desired track of the magnetic disk 111, and is positioned there. The VCM 116 is driven by a drive current (or a drive voltage) supplied thereto from the SVC 135.

The preamplifier 117 supplies a write signal (write current) corresponding to the write data supplied thereto from the R/W channel 134 to the write head 114. Further, the preamplifier 117 amplifies a read signal output from the read head 115 and transmits the amplified read signal to the R/W channel 134.

The CPU 132 is a main controller of the magnetic disk device 100 and executes control of the read/write operation of the disk section 110 and servo control necessary for positioning of the magnetic head 113.

The R/W channel 134 is a signal processing circuit configured to process signals relating to read/write. The R/W channel 134 includes a read channel configured to execute signal processing of read data and a write channel configured to execute signal processing of write data. The R/W channel 134 converts a read signal into digital data, and demodulates read data from the digital data. The R/W channel 134 encodes write data transferred thereto from the HDC 133, and transfers the encoded write data to the preamplifier 117.

The HDC 133 controls write of data to the magnetic disk 111 and read of data from the magnetic disk 111 through the magnetic head 113, the preamplifier 117, the R/W channel 134, and the CPU 132. The HDC 133 constitutes an interface between the magnetic disk device 100 and a host, and executes transfer control of read data and write data. That is, the HDC 133 functions as a host interface controller configured to receive a signal transferred from the host and transfer a signal to the host. When transferring a signal to the host, the HDC 133 executes error-correcting processing of data of a reproduced signal read and demodulated by the magnetic head 113 in accordance with the CPU 132. Further, the HDC 133 receives a command (write command, read command or the like) transferred from the host and transmits the received command to the CPU 132.

The SVC 135 controls drive of the SPM 112 and the VCM 116 in accordance with the control of the CPU 132. By driving the SPM 112 and the VCM 116, the magnetic head 113 is positioned to the target track on the magnetic disk 111.

The memory 136 includes the ROM 137 which is a nonvolatile memory and the RAM 138 which is a volatile memory. The memory 136 stores therein programs and parameters necessary for the processing of the CPU 132.

Figure 2:
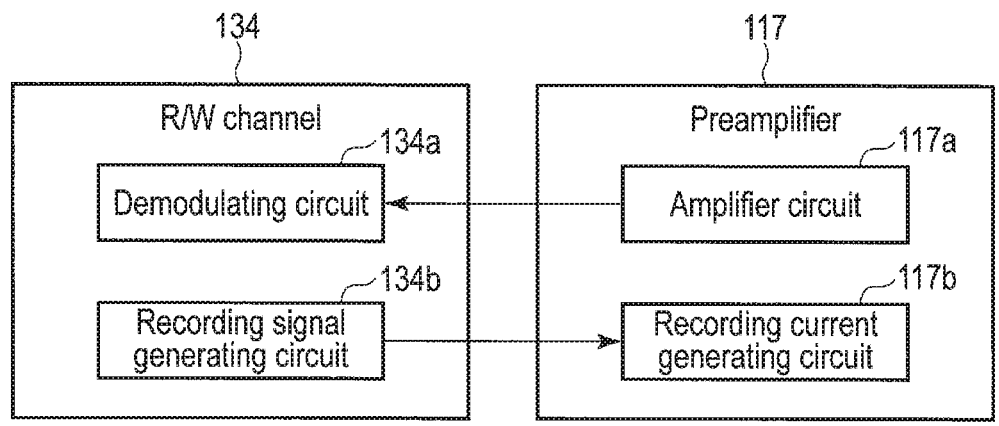
FIG. 2 is a view showing an example of the configuration of each of an R/W channel and a preamplifier according to the first embodiment.

FIG. 2 is a view showing an example of the configuration of each of the R/W channel 134 and the preamplifier 117.

As shown in FIG. 2, the R/W channel 134 is provided with a demodulating circuit (third circuit) 134a and a recording signal generating circuit (fourth circuit) 134b. Further, the preamplifier 117 is provided with an amplifier circuit (second circuit) 117a and a recording current generating circuit (first circuit) 117b. The demodulating circuit 134a demodulates a reproduced waveform transferred thereto from the amplifier circuit 117a. The recording signal generating circuit 134b transfers a recording signal to the recording current generating circuit 117b. The amplifier circuit 117a amplifies a signal reproduced from the magnetic disk 111 by the read head 115. The recording current generating circuit 117b generates a recording current to be used to write data to the magnetic disk 111 by means of the write head 114. It should be noted that, in FIG. 2, connecting lines other than the connecting line between the demodulating circuit 134a and the amplifier circuit 117a, and the connecting line between the recording signal generating circuit 134b and the recording current generating circuit 117b are omitted.

Data read by the read head 115 from the magnetic disk 111 is transferred from the disk section 110 to the control section 130 through the amplifier circuit 117a and the demodulating circuit 134a as a read signal. Further, a write signal is transferred from the control section 130 to the write head 114 of the disk section 110 through the recording signal generating circuit 134b and the recording current generating circuit 117b.

Further, the R/W channel 134 and the preamplifier 117 are connected to each other with a power save signal line (see FIG. 1), and the R/W channel 134 is configured in such a manner as to be able to transmit a power save signal to the preamplifier 117 on the basis of an instruction of the CPU 132. Further, in this embodiment, the CPU 132 is configured in such a manner as to be able to adjust the timing of turning on/off the power save signal. Here, the term "to adjust" implies securing the transient time for transition from an idle state or sleep mode to a read mode and, implies, for example, negating a power save signal a predetermined time prior to the timing of actually asserting the servo gate. Further, the timing of asserting the power save signal is also made adjustable. Here the term "to adjust" implies securing the time to acquire the servo signal waveform to the end, and implies, for example, asserting the power save signal after an elapse of a predetermined time from the timing of actually negating the servo gate. Further, in consideration of occurrence of a circuit delay, it is also conceivable that the timing of negating the power save signal is adjusted to the timing a predetermined time prior to the timing of actually asserting the servo gate. Furthermore, it is also possible for the CPU 132 to adjust the timing of negating/asserting the power save signal to the timing of actually asserting/negating the servo gate in coincidence with each other. Each of the adjustments described above is carried out in such a manner that a plurality of adjustment modes are prepared in advance in the memory 136 and, for example, the CPU 132 appropriately sets a mode according to the state of data to be transferred to the R/W channel 134 to thereby control the R/W channel 134 and the preamplifier 117.

FIG. 3 is a view showing an example of a relationship between the magnetic head 113 and data recorded on the magnetic disk 111.

As shown in FIG. 3, the slider 113a constituting the tip end part of the magnetic head 113 is positioned on the upper side of the magnetic disk 111. In the slider 113a, the write head 114 and the read head 115 are included. Further, on the magnetic disk 111, data D1 which is user data, and servo data D2 used for carrying out positioning of the magnetic head 113 on the magnetic disk 111 are recorded. It should be noted that the rotational direction of the magnetic disk 111 is leftward in FIG. 3 as indicated by the arrow.

The write head 114 and the read head 115 are separate from each other by a predetermined distance (hereinafter referred to as a "head gap") in the rotational direction of the magnetic disk 111. For this reason, when extension processing of a data area to be described later with reference to FIG. 4 and FIG. 5 is not executed, a need to make the write head 114 complete write of data at timing at which the read head 115 reads the servo data D2 arises, and a state where the data area in the head gap cannot be utilized occurs.

Next, the extension processing of a data area will be described below with reference to FIG. 4 and FIG. 5.

FIG. 4 is a view for explaining the extension processing of a data area, and FIG. 5 is a flowchart showing an example of the data area extension processing.

On the upper side of FIG. 4, a waveform of a reproduced signal RD, a servo gate signal SG, a write gate signal WG, and a waveform of a power save signal are shown. The waveform of the reproduced signal RD is a waveform obtained by amplifying an output which is read by the read head 115 from the magnetic disk 111 by the preamplifier 117. The servo gate signal SG is a signal used to specify a position from which servo data is to be read in order to demodulate a servo signal. When the servo gate signal SG is on, servo data is read. The write gate signal WG is a signal used to specify a position to which data is to be written to the magnetic disk 111 by the write head 114. When the write gate signal WG is on, data is written to the magnetic disk. The power save signal PWR_SAVE is a signal used to turn off the amplifier circuit 117a of the preamplifier 117. More specifically, when the power save signal PWR_SAVE is off, the amplifier circuit 117a is turned on. Therefore, the output of the waveform read by the read head 115 is amplified, and the reproduced signal RD is output from the preamplifier 117a. Further, when the power save signal PWR_SAVE is on, the amplifier circuit 117a is turned off. Therefore, the output of the waveform read by the read head 115 is not amplified, and the reproduced signal RD is not output from the preamplifier 117a.

On the lower side of FIG. 4, a state where the slider 113a located at a position P1 has temporarily transitioned to a position P2 along the arrow shown in FIG. 4 is schematically shown. It should be noted that the slider 113a located at the position P1 is indicated by broken lines, and the slider 113a located at the position P2 is indicated by solid lines. Further, a head gap W1 indicates the distance between the write head 114 and the read head 115.

Next, with reference to FIG. 4 and FIG. 5, the operation of the data area extension processing will be described below. The R/W channel 134 receives an instruction of the CPU 132, and the instruction is transmitted from the R/W channel 134 to the preamplifier 117, whereby the data area extension processing is executed.

As shown in FIG. 5, after data write is started (ST1: YES), it is determined whether or not the read head 115 has been positioned to the servo position at which the read head 115 is to read the servo data D2 (ST2). When it is determined that the read head 115 has been positioned to the servo position (ST2: YES), the servo gate is asserted and the servo signal SG is turned on (ST3). At this time, the slider 113a is located at the position P1 of FIG. 4, and the read head 115 is located at the position TC1. Further, the position of the write head 114 is a position spaced apart by the head gap W1. Still further, the power save signal PWR_SAVE is turned off at timing at which the read head 115 is positioned to the position TC1, and consequently, the amplifier circuit 117a of the preamplifier 117 is operated, the output of the waveform read by the read head 115 is amplified, and the reproduced signal RD (that is, servo data) is output from the preamplifier 117. At this time, the write gate signal WG is left asserted, and hence write of data to the magnetic disk 111 is continued.

The explanation will be continued with reference to FIG. 5 again. When the servo gate is asserted as described above (ST3), the servo data D2 is read (ST4). Then, it is determined whether or not write of data is to be terminated (ST5) and, when it is determined that write of data is not to be terminated (ST5: NO), read of the servo data D2 is continued (ST4) and, when it is determined that write of data is to be terminated (ST5: YES), the write gate is negated (ST6). At this time, the slider 113a is located at the position P2 of FIG. 4, the read head 115 is located at the position TC2, and the write head 114 is located at the position TC1. Further, the servo gate is left asserted, and hence although read of the servo data D2 is continued, the write gate has already been negated, and thus write of data has already been terminated.

As shown in FIG. 4, in an area from the position TC1 to the position TC2 which corresponds to the head gap W1, the write gate is asserted and the servo gate is also asserted. Accordingly, it is possible to read the servo data D2 during write of data. In the case where the configuration of this embodiment is not employed, write of data is terminated, in order to read the servo data D2, at a position preceding the position at which the servo gate is to be asserted. In this embodiment, however, the area from the position TC1 to the position TC2 which corresponds to the head gap W1 can be turned to a data extension area W2 to which data can be written.

Figure 6:
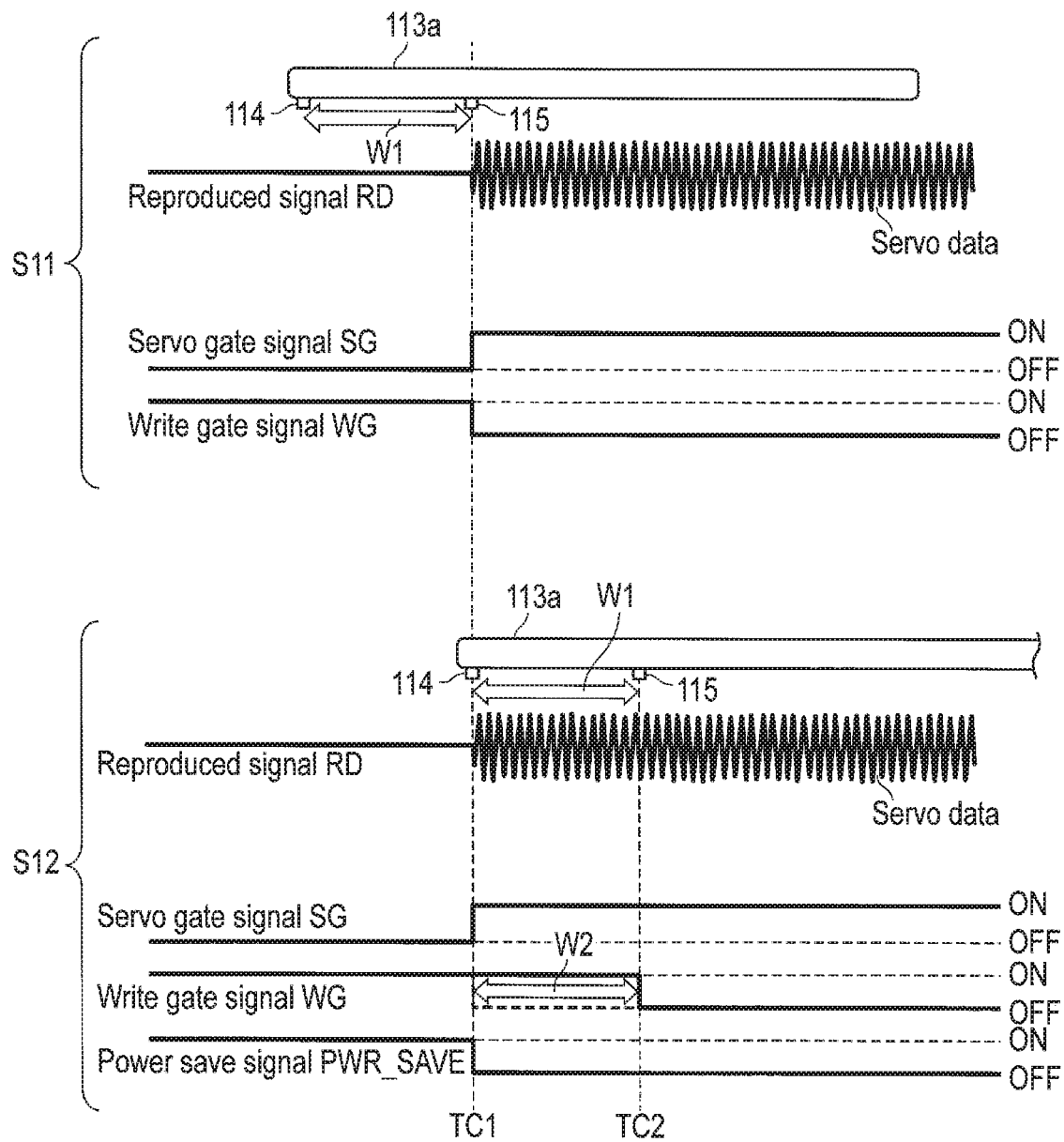
FIG. 6 is a view showing an example of comparison between processing types according to the first embodiment.

FIG. 6 is a view showing an example of comparison between a case where the processing described previously with reference to FIG. 4 and FIG. 5 is carried out (case S12) and a case where the above processing is not carried out (case S11). The case S1 is shown on the upper side of FIG. 6, and the case S12 is shown on the lower side.

First, the case S11 will be described. At timing at which the read head 115 is positioned to the position TC1, the write gate is negated and write of data is terminated. At this time, the position of the write head 114 is located a distance corresponding to the head gap W1 forward. As described above, in the case S11, control is carried out in such a manner that write of data and read of data are not carried out in parallel with each other, and hence the area in the head gap W1 cannot be used as a data area.

Next, the case S12 will be described. When the power save signal PWR_SAVE is turned off at the position TC1, the servo gate is also asserted. Accordingly, the output of the waveform read by the read head 115 is amplified by the amplifying circuit 117a and is output from the preamplifier 117. In the case S12, even after read of data becomes executable, the write gate is not negated and write of data is continued. Subsequently, when the rotation of the magnetic disk 111 proceeds and the read head 115 is positioned to the position TC2, the write gate is negated and write of data is terminated. That is, in the area between the position TC1 and the position TC2 which corresponds to the head gap W1, read of servo data is executed in parallel during write of data. As a result, the area from the position TC1 to the position TC2 can be turned to the data extension area W2 to which data can be written. Consequently, in the case S12, an area of the magnetic disk 111 which cannot be utilized as a data area such as that of the case S11 can be reduced.

As has been described above, according to the magnetic disk device 100 of this embodiment, it is possible, by reading the servo data D2 during write of data, to secure the data extension area W2 in which write of data and read of data are carried out in parallel with each other and to extend the area in which data processing for the magnetic disk 111 can be carried out, at the time of designing of the data format.

Modification Example

Figure 7:
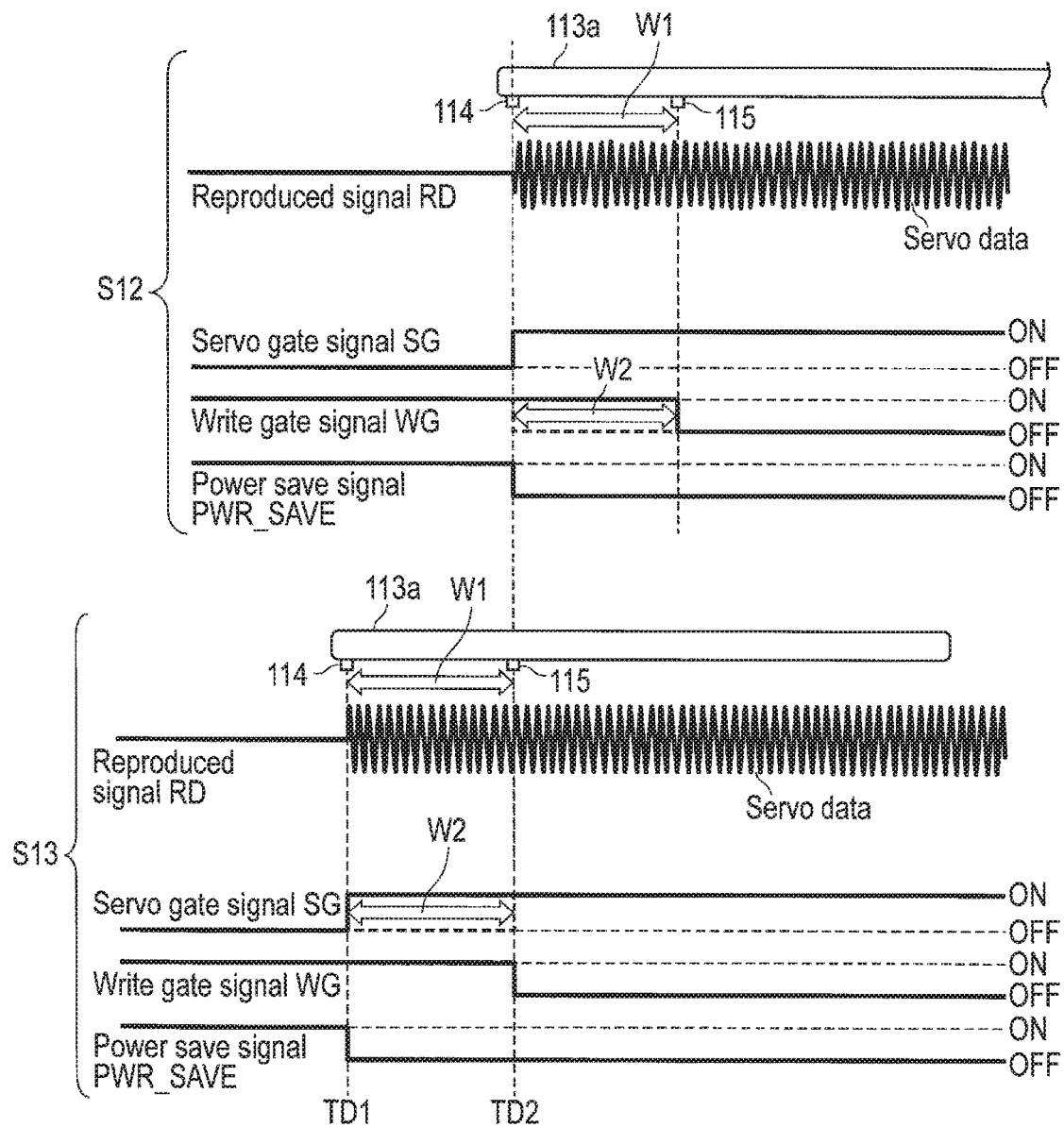
FIG. 7 is a view showing an example of comparison between processing types according to a modification example of the first embodiment.

FIG. 7 shows effects in a case where not the user data D1 but the servo data D2 is written to the data extension area W2. The case S12 described previously is shown on the upper side of FIG. 7, and a case S13 of this modification example is shown on the lower side of FIG. 7.

The case S13 will be described below. Since the servo data D2 is written to the data extension area W2, as compared to the case S12, read starts a time corresponding to the data extension area W1 (in other words, the head gap W1) early during write of data. At this time, the write gate is asserted, and hence write of data is continued. Subsequently, although the servo gate is asserted, when the time corresponding to the head gap W1 has elapsed, in other words, when the read head 115 is positioned to the position TD2, the write gate is negated. According to this configuration, the magnetic disk device 100 can use the data extension area W2 as an area to which servo data is written in advance. The area to which the servo data D2 can be written is increased, and in addition, the data amount of the servo data D2 can be increased or the pitch with which data is written can be sufficiently increased. Consequently, the magnetic disk device 100 can improve the accuracy of reading the servo data D2.

In the above-described embodiment, at timing at which the power save signal PWR_SAVE is turned off, the servo gate signal SG is also turned on. However, the timing is not limited to this example. For example, even if the power save signal PWR_SAVE is turned on, a circuit delay or the like may occur, and the amplifier circuit 117a may not operate immediately. Therefore, it is conceivable that the timing of turning off the power save signal PWR_SAVE is set to be earlier than the timing of turning on the servo gate signal SG. If the timing of the power save signal PWR_SAVE is shifted as described above, as shown in FIG. 11 which will be described later, user data may be read slightly before the servo data D2 is read. It is conceivable that such data is removed, for example, by filter processing or the like.

Figure 11:
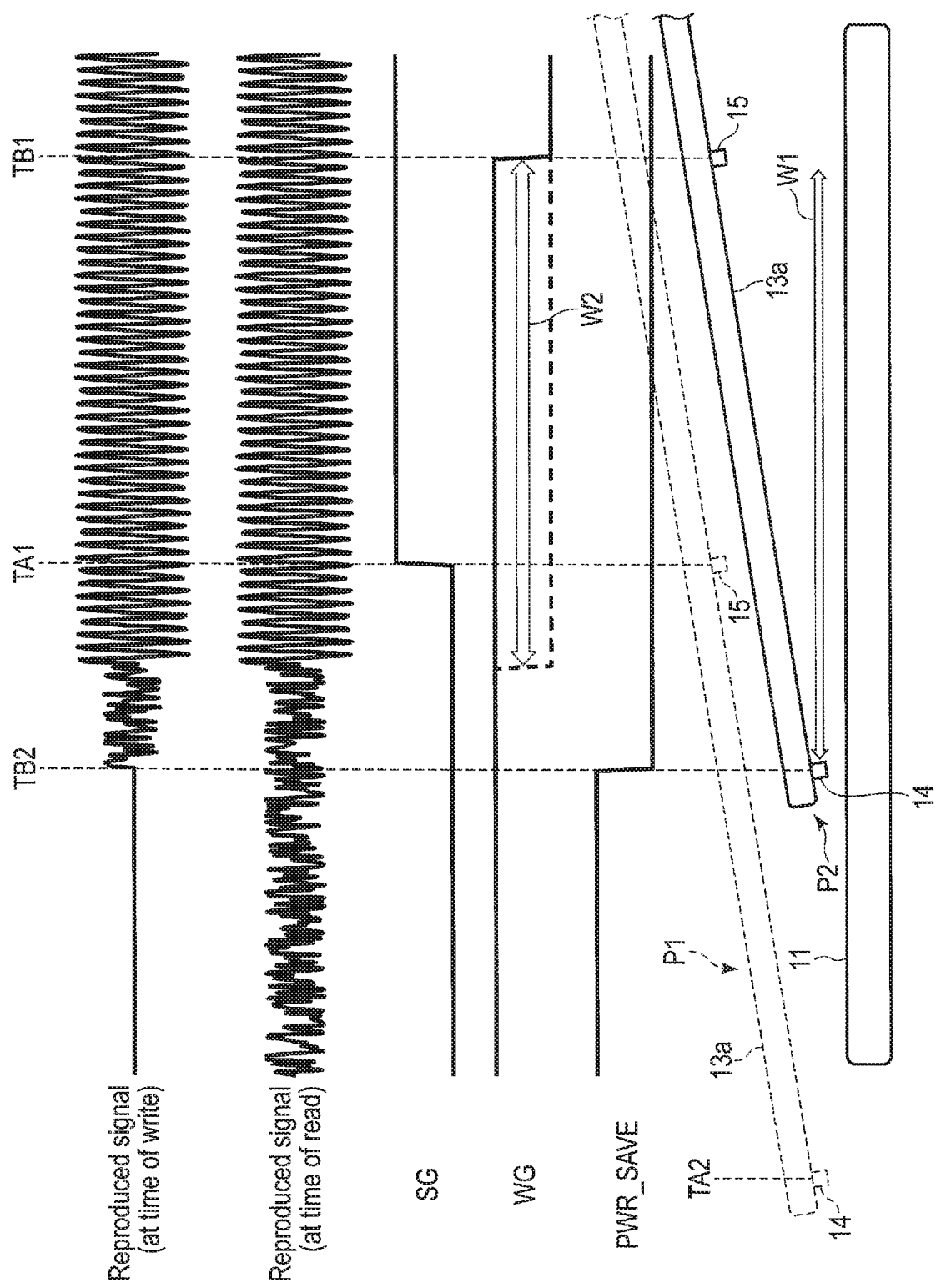
FIG. 11 is a view for explaining extension processing of a data area according to the second embodiment.

Further, the time of the head gap W1 and the time of the data extension area W2 coincide with each other in the above-described embodiment, but do not necessarily coincide with each other. Due to the circuit delay or the like, the data extension area W2 may be extended as shown in FIG. 11 which will be described later.

In the following second embodiment, an embodiment where the timing of turning off the power save signal PWR_SAVE is set to be earlier than the timing of turning on the servo gate signal SG and the data extension area W2 is extended. Note that the reproduced signal RD of the first embodiment corresponds to the reproduced signal (at the time of write) of FIG. 11 or the like. The reproduced signal (at the time of read) is shown for the purpose of reference in comparison with the time of write. Further, the third embodiment to the fifth embodiment which will be described below can be applied to the magnetic disk device 100 of the first embodiment and a magnetic disk device 1 which will be described below.

Second Embodiment

Figure 8:
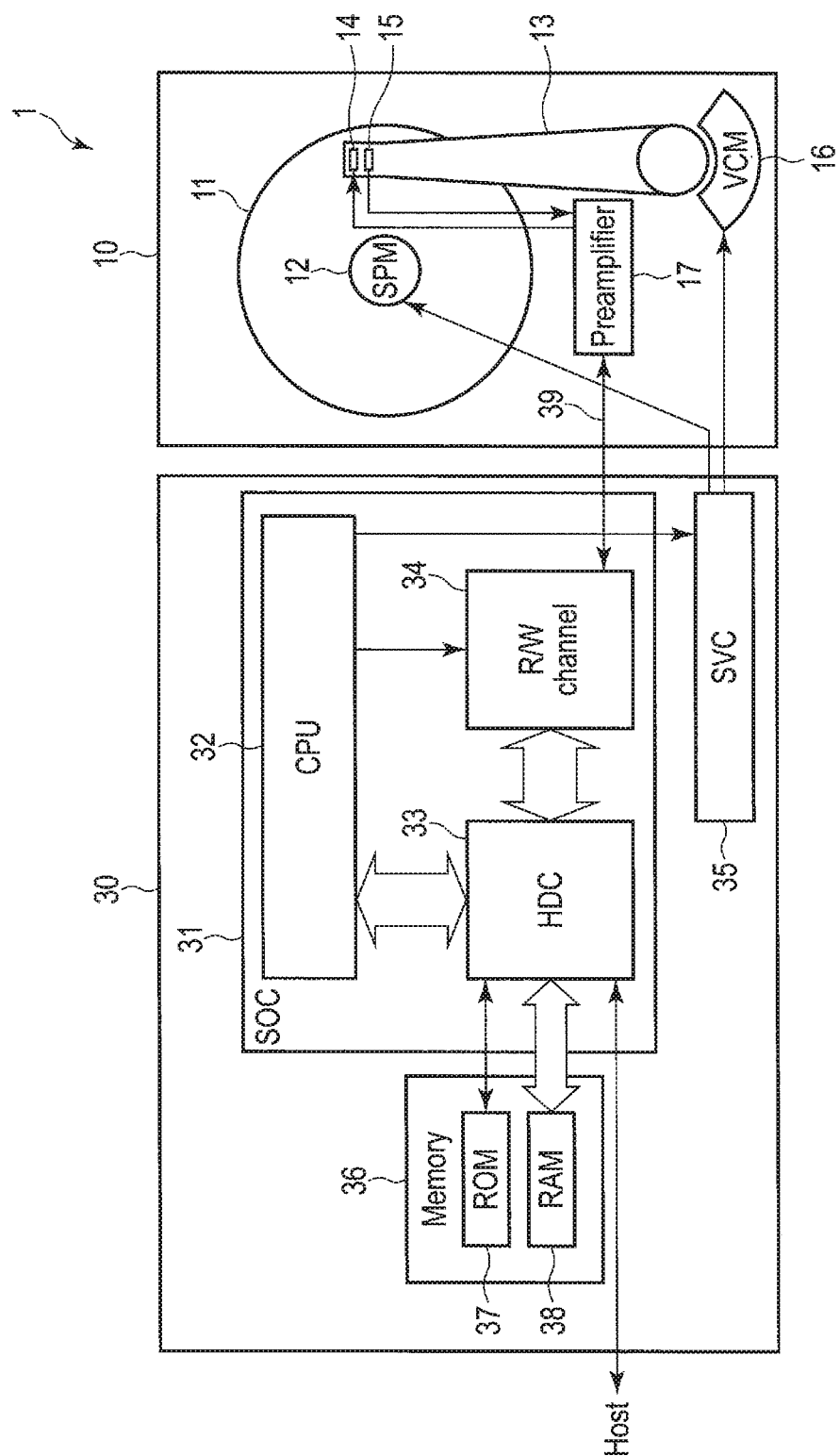
FIG. 8 is a view showing an example of the schematic configuration of a magnetic disk device according to the second embodiment.

FIG. 8 is a view showing an example of the schematic configuration of a magnetic disk device 1.

As shown in FIG. 8, the magnetic disk device 1 is provided with a disk section 10 and control section 30. The disk section 10 is provided with a magnetic disk 11, spindle motor (hereinafter referred to as an "SPM") 12, magnetic head 13, voice coil motor (hereinafter referred to as a "VCM") 16, and preamplifier 17. The magnetic head 13 includes a write head 14 and read head 15. Further, the control section 30 is provided with a System on Chip (hereinafter referred to as an "SOC") 31, servo combo (hereinafter referred to as an "SVC") 35, and memory 36. The SOC (control section) 31 is constituted of a CPU 32, hard disk controller (hereinafter referred to as an "HDC") 33, and read/write (R/W) channel 34 serving as a processing section all of which are provided on one chip. The memory 36 is provided with a ROM 37 and RAM 38. Further, the preamplifier 17 and R/W channel 34 are connected to each other by a plurality of signal lines 37 including a power save signal line used to set active/power save of a signal read by the read head 15. It should be noted that an instruction as to active/power save of a power save signal is transmitted from the HDC 33 to the preamplifier 17 through the R/W channel 34.

The magnetic disk 11 includes a substrate formed into, for example, a disk-like shape and constituted of a non-magnetic material. In each surface of the substrate, a soft magnetic layer constituted of a material exhibiting a soft magnetic property and serving as a foundation layer, magnetic recording layer having a magnetic anisotropy in the direction perpendicular to the disk surface and formed on the soft magnetic layer, and protective film layer formed on the magnetic recording layer are stacked one on top of the other in the order mentioned. Here, the direction to the magnetic head 13 is defined as the direction to the upper layer.

The magnetic disk 11 is fixed to the spindle motor (SPM) 12 and is rotated by the SPM 12 at a predetermined rotational speed. It should be noted that the number of the magnetic disk 11 is not limited to one, and a plurality of magnetic disks 11 may be provided on the SPM 12. The SPM 12 is driven by a drive current (or a drive voltage) supplied thereto from the SVC 35.

The magnetic head 13 is provided with a slider 13a at a tip end part thereof, and includes the write head 14 and read head 15 formed on the slider 13a (see FIG. 10). Regarding the magnetic head 13, a plurality of magnetic heads 13 are provided according to the number of the magnetic disks 11.

On the VCM 16, an actuator including the magnetic head 13 at a tip end part thereof is rotatably provided. The actuator is rotated by the VCM 16, whereby the magnetic head 13 is moved to a position on the desired track of the magnetic disk 11, and is positioned there. The VCM 16 is driven by a drive current (or a drive voltage) supplied thereto from the SVC 35.

The preamplifier 17 supplies a write signal (write current) corresponding to the write data supplied thereto from the R/W channel 34 to the write head 14. Further, the preamplifier 17 amplifies a read signal output from the read head 15 and transmits the amplified read signal to the R/W channel 34.

The CPU 32 is a main controller of the magnetic disk device 1 and executes control of the read/write operation of the disk section 10 and servo control necessary for positioning of the magnetic head 13.

The R/W channel 34 is a signal processing circuit configured to process signals relating to read/write. The R/W channel 34 includes a read channel configured to execute signal processing of read data and write channel configured to execute signal processing of write data. The R/W channel 34 converts a read signal into digital data, and demodulates read data from the digital data. The R/W channel 34 encodes write data transferred thereto from the HDC 33, and transfers the encoded write data to the preamplifier 17.

The HDC 33 controls write of data to the magnetic disk 11 and read of data from the magnetic disk 11 through the magnetic head 13, preamplifier 17, R/W channel 34, and CPU 32. The HDC 33 constitutes an interface between the magnetic disk device 1 and host, and executes transfer control of read data and write data. That is, the HDC 33 functions as a host interface controller configured to receive a signal transferred from the host and transfer a signal to the host. When transferring a signal to the host, the HDC 33 executes error-correcting processing of data of a reproduced signal read and demodulated by the magnetic head 13 in accordance with the CPU 32. Further, the HDC 33 receives a command (write command, read command or the like) transferred from the host and transmits the received command to the CPU 32.

The SVC 35 controls drive of the SPM 12 and VCM 16 in accordance with the control of the CPU 32. By driving the SPM 12 and VCM 16, the magnetic head 13 is positioned to the target track on the magnetic disk 11.

The memory 36 includes the ROM 37 which is a nonvolatile memory and RAM 38 which is volatile memory. The memory 36 stores therein programs and parameters necessary for the processing of the CPU 32.

FIG. 9 is a view showing an example of the configuration of each of the R/W channel 34 and preamplifier 17.

As shown in FIG. 9, the R/W channel 34 is provided with a demodulating circuit (third circuit) 34a and recording signal generating circuit (fourth circuit) 34b. Further, the preamplifier 17 is provided with an amplifier circuit (second circuit) 17a and recording current generating circuit (first circuit) 17b. The demodulating circuit 34a demodulates a reproduced waveform transferred thereto from the amplifier circuit 17a. The recording signal generating circuit 34b transfers a recording signal to the recording current generating circuit 17b. The amplifier circuit 17a amplifies a signal reproduced from the magnetic disk 11 by the read head 15. The recording current generating circuit 17b generates a recording current to be used to write data to the magnetic disk 11 by means of the write head 14. It should be noted that, in FIG. 9, connecting lines other than the connecting line between the demodulating circuit 34a and amplifier circuit 17a, and connecting line between the recording signal generating circuit 34b and recording current generating circuit 17b are omitted.

Data read by the read head 15 from the magnetic disk 11 is transferred from the disk section 10 to the control section 30 through the amplifier circuit 17a and demodulating circuit 34a as a read signal. Further, a write signal is transferred from the control section 30 to the write head 14 of the disk section 10 through the recording signal generating circuit 34b and recording current generating circuit 17b.

Further, the R/W channel 34 and preamplifier 17 are connected to each other with a power save signal line (see FIG. 8), and the R/W channel 34 is configured in such a manner as to be able to transmit a power save signal to the preamplifier 17 on the basis of an instruction of the CPU 32. Further, in this embodiment, the CPU 32 is configured in such a manner as to be able to adjust the timing of turning on/off the power save signal. Here, the term "to adjust" implies securing the transient time for transition from an idle state or sleep mode to a read mode and, implies, for example, negating a power save signal a predetermined time prior to the timing of actually asserting the servo gate. Further, the timing of asserting the power save signal is also made adjustable. Here the term "to adjust" implies securing the time to acquire the servo signal waveform to the end, and implies, for example, asserting the power save signal after an elapse of a predetermined time from the timing of actually negating the servo gate. Further, in consideration of occurrence of a circuit delay, it is also conceivable that the timing of negating the power save signal is adjusted to the timing a predetermined time prior to the timing of actually asserting the servo gate. Furthermore, it is also possible for the CPU 32 to adjust the timing of negating/asserting the power save signal to the timing of actually asserting/negating the servo gate in coincidence with each other. Each of the adjustments described above is carried out in such a manner that a plurality of adjustment modes are prepared in advance in the memory 36 and, for example, the CPU 32 appropriately sets a mode according to the state of data to be transferred to the R/W channel 34 to thereby control the R/W channel 34 and preamplifier 17.

FIG. 10 is a view showing an example of a relationship between the magnetic head 13 and data recorded on the magnetic disk 11.

As shown in FIG. 10, the slider 13a constituting the tip end part of the magnetic head 13 is positioned on the upper side of the magnetic disk 11. In the slider 13a, the write head 14 and read head 15 are included. Further, on the magnetic disk 11, data D1 which is user data, and servo data D2 used for carrying out positioning of the magnetic head 13 on the magnetic disk 11 are recorded. It should be noted that the rotational direction of the magnetic disk 11 is leftward in FIG. 10 as indicated by the arrow.

The write head 14 and read head 15 are separate from each other by a predetermined distance (hereinafter referred to as a "head gap"). For this reason, when extension processing of a data area to be described later with reference to FIG. 11 and FIG. 12 is not executed, a need to make the write head 14 complete write of data at timing at which the read head 15 reads the servo data D2 arises, and a state where the data area in the head gap cannot be utilized occurs.

Next, the extension processing of a data area will be described below with reference to FIG. 11 and FIG. 12.

Figure 12:
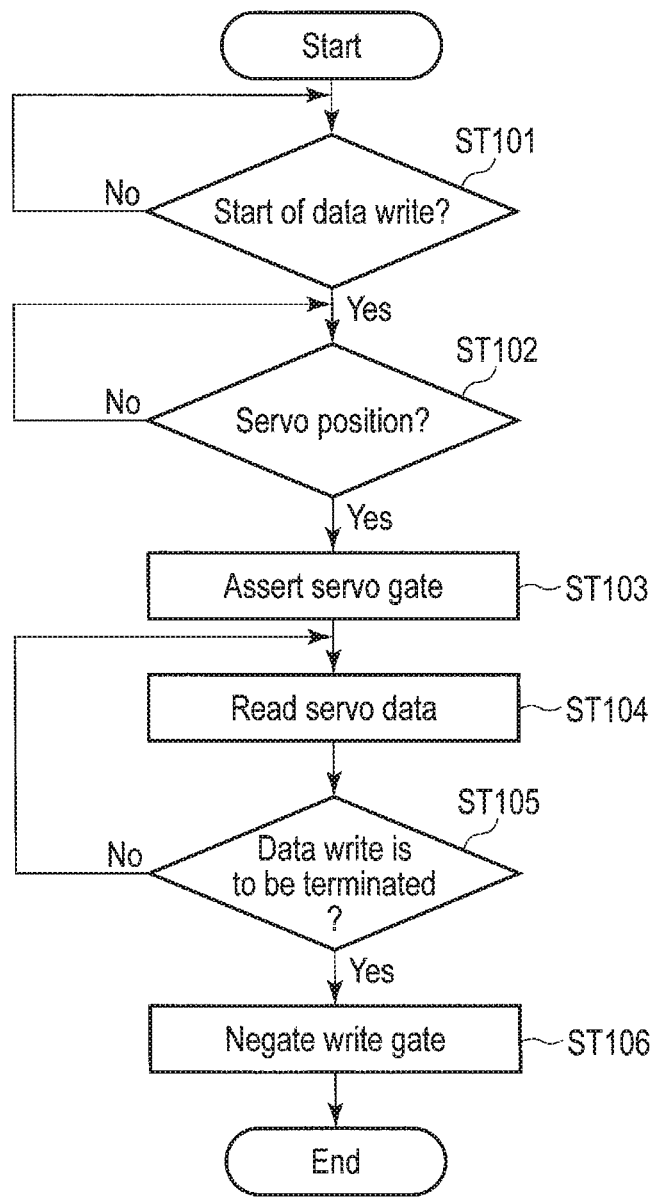
FIG. 12 is a flowchart showing an example of the extension processing of a data area according to the second embodiment.

FIG. 11 is a view for explaining the extension processing of a data area, and FIG. 12 is a flowchart showing an example of the data area extension processing.

In FIG. 11, a waveform of a reproduced signal (at the time of write), waveform of a reproduced signal (at the time of read), servo gate signal SG, write gate signal WG, and PWR_SAVE signal which is a signal used to negate/assert power save are each shown. The waveform of the reproduced signal is a waveform obtained by amplifying an output reproduced by the read head 15 by using the preamplifier 17. The servo gate signal SG is a signal used to specify a servo position in order to demodulate a servo signal. The write gate signal WG is a signal used to specify a position to which data is to be written by the write head 14. The power save signal PWR_SAVE is a signal for turning off the amplifier circuit 17a of the preamplifier 17. Further, FIG. 11 schematically shows the state where the slider 13a located at the position P1 has moved to the position P2 along the arrow shown in FIG. 11. It should be noted that the slider 13a located at the position P1 is indicated by broken lines, and slider 13a located at the position P2 is indicated by solid lines. Further, the head gap W1 indicates the distance between the write head 14 and read head 15.

Next, with reference to FIG. 11 and FIG. 12, the operation of the data area extension processing will be described below. The R/W channel 34 receives an instruction of the CPU 32, and the instruction is transmitted from the R/W channel 34 to the preamplifier 17, whereby the data area extension processing is executed.

After data write is started (ST101: YES), it is determined whether or not the read head 15 has been positioned to the servo position at which the read head 15 is to read the servo data D2 (ST102). When it is determined that the read head 15 has been positioned to the servo position (ST102: YES), the servo gate is asserted and servo signal SG is turned on (ST103). At this time, the slider 13a is positioned at the position P1 of FIG. 11, read head 15 is positioned at the position TA1, and write head 14 is positioned at the position TA2. The power save signal PWR_SAVE has been negated, and hence the read signal becomes able to be output and, when the servo gate signal SG is turned on, it becomes possible to read the servo data D2. At this time, the write gate signal WG is left asserted, and hence write of data is continued.

When the servo gate is asserted as described above (ST103), the servo data D2 is read (ST104). Then, it is determined whether or not write of data is to be terminated (ST105) and, when it is determined that write of data is not to be terminated (ST105: NO), read of the servo data D2 is continued (ST104) and, when it is determined that write of data is to be terminated (ST105: YES), the write gate is negated (ST106). At this time, the slider 13a is positioned at the position P2 of FIG. 11, read head 15 is positioned at the position TB1, and write head 14 is positioned at the position TB2. At this time, the servo gate is left asserted, and hence although read of the servo data D2 is continued, the write gate has already been negated, and thus write of data has already been terminated.

As described above, from the position TA1 to the position TB1, the write gate is asserted and servo gate is also asserted. Accordingly, it is possible to read the servo data D2 during write of data. Thus, in the case where the configuration of this embodiment is not employed, write is terminated, in order to read the servo data D2, at a position preceding the position at which the servo gate is to be asserted (between the position TA1 and position TB2), in this embodiment however, it is possible to make the area from the preceding position concerned to the position at which write is terminated (position TB1) a data extension area W2.

Figure 13:
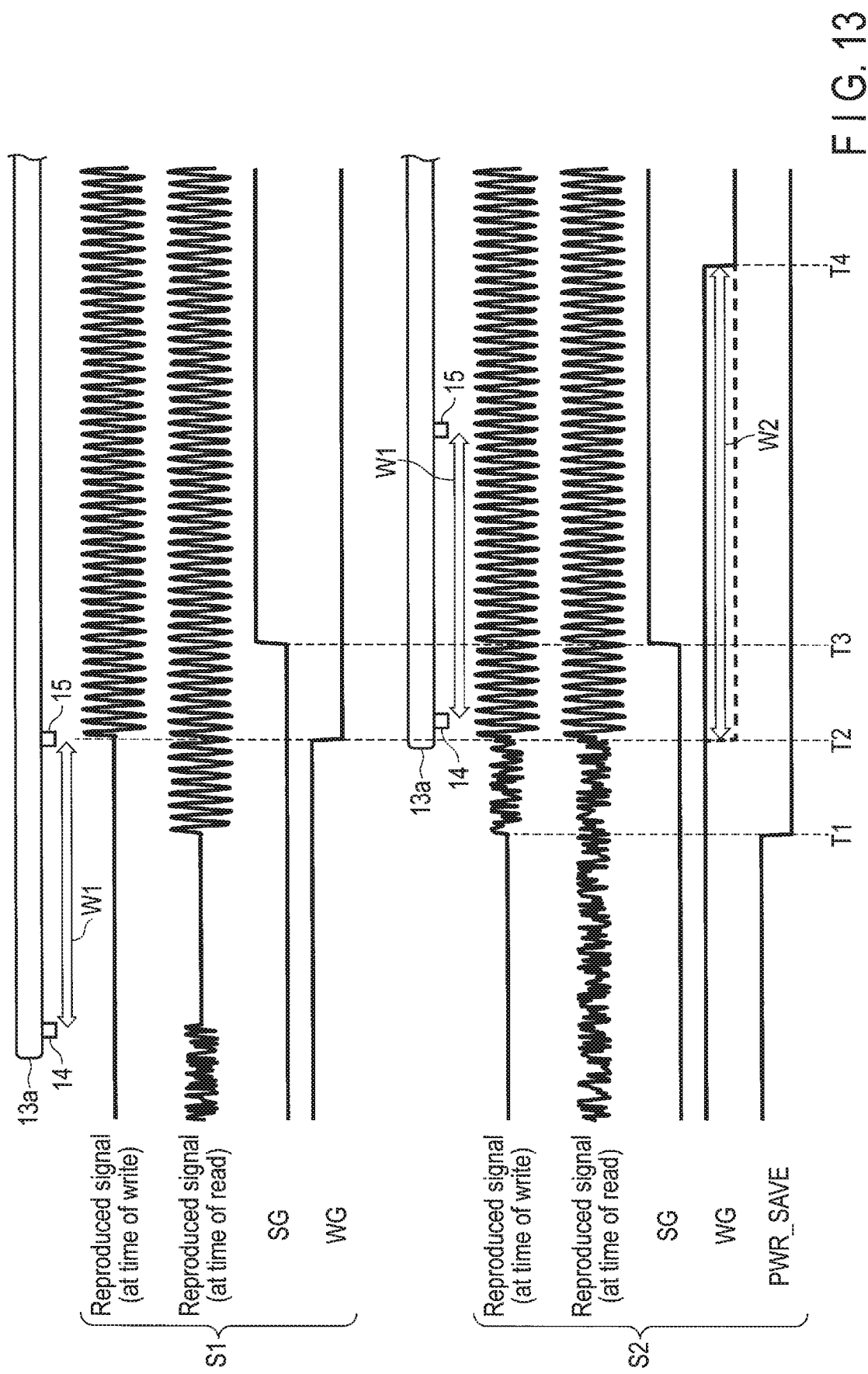
FIG. 13 is a view showing an example of comparison between processing types according to the second embodiment.

FIG. 13 is a view showing an example of comparison between the case where the processing described previously with reference to FIG. 11 and FIG. 12 is carried out (case S2) and case where the above processing is not carried out (case S1). The case S1 is shown on the upper side of FIG. 13, and case S2 is shown on the lower side.

First, the case S1 will be described. When the read head 15 is positioned at the position T2, the write gate is negated and write is terminated. At this time, the write head 14 is positioned at the position T1. As described above, control is carried out in such a manner that write of data and read of data are not carried out in parallel with each other, and hence an area which cannot be used as a data area is created.

Next, the case S2 will be described. The power save signal PWR_SAVE is turned off at the position T1 and read of data is enabled at the same time, thereafter when the read head 15 is positioned at a position in the vicinity of the position T2, the write gate is not negated and write of data is continued. Then, when the read head 15 is at the position T3, the servo gate is asserted and read of the servo data D2 is started. At this time too, write of data is not terminated and, when the write head 14 is positioned to the position T4, the write gate is negated and write of data is terminated. That is, between the position T3 and position T4, read of the servo data is executed in parallel during write of data. By carrying out the processing in this manner, it is possible to provide the data extension area W2 extending from the position T2 to the position T4, and reduce the area which cannot be utilized as a data area unlike the case S1.

As has been described above, according to the magnetic disk device 1 of this embodiment, by reading the servo data D2 during write of data, it is possible, at the time of designing of the data format, to secure the data extension area W2 in which write of data and read of data are carried out in parallel with each other, and extend the area in which data processing for the magnetic disk 11 can be carried out.

Third Embodiment

The third embodiment differs from the first embodiment in that the processing to be carried out when the servo data has failed to be read is added. It should be noted that configurations identical to the first embodiment are denoted by reference symbols identical to the first embodiment and detailed descriptions of these configurations are omitted.

Figure 14:
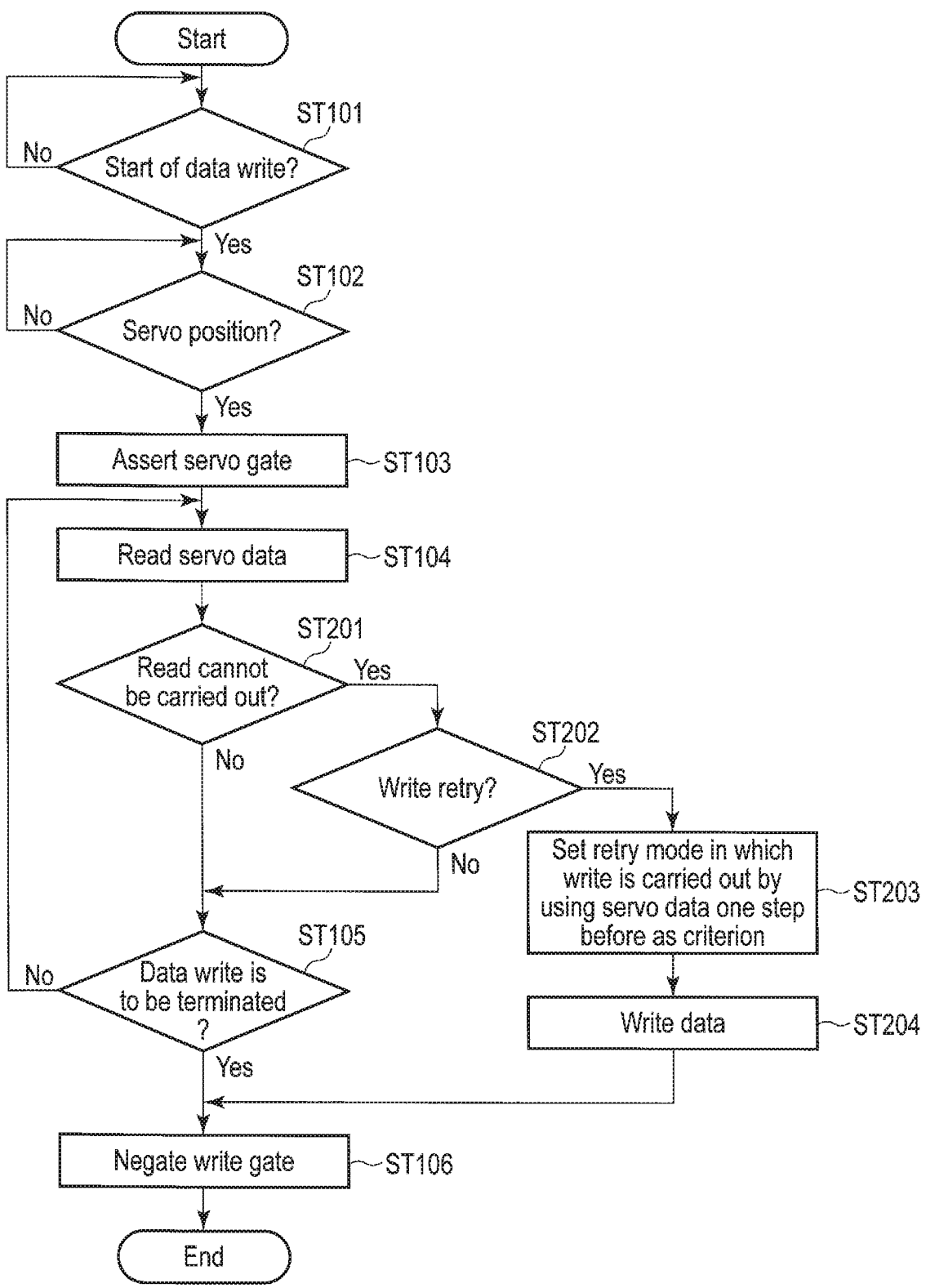
FIG. 14 is a flowchart showing an example of extension processing of a data area according to the second embodiment.

FIG. 14 is a flowchart showing an example of extension processing of the data area. It should be noted that the processing of steps ST101 to ST106 is identical to the first embodiment, and hence the processing of the added steps ST201 to ST204 will be described below. It should be noted that the procedure in which the R/W channel 34 receives an instruction of the CPU 32, and the instruction is transmitted from the R/W channel 34 to the preamplifier 17, whereby the processing is executed is identical to the first embodiment.

When the processing of step ST104 is completed, it is determined whether or not read of the servo data D2 cannot be carried out (ST201). When read of the servo data D2 cannot be carried out (ST201: NO), i.e., when the servo data D2 fails to be read, the flow advances to the processing of step ST105, and the already-described processing is executed.

Further, when read of the servo data D2 can be carried out (ST201: YES), it is determined whether or not a write retry is to be carried out (ST202). When it is determined that a write retry is not to be carried out (ST202: NO), the flow advances to the processing of step ST105, and the already-described processing is executed.

On the other hand, when it is determined that a write retry is to be carried out (ST202: YES), a retry mode in which write is carried out by using servo data one step before as a criterion is set (ST203), and then write of data is retried (ST204). Then, the processing of step ST106 is executed. Thereby, even when the servo data D2 cannot be read, it becomes possible for the magnetic disk device 1 to execute the write processing. In the case where read of data is carried out while data is written, write of data of the write head 14 and read of data of the read head 15 are simultaneously executed, and hence there is a case where noise is added to the servo signal, and although a case where write of data is unsuccessful is probable, it becomes possible for the magnetic disk device 1, by carrying out a retry of write of data, to securely execute write of data.

Fourth Embodiment

The fourth embodiment differs from the first embodiment in that a band-pass filter setting circuit is provided in each of a demodulating circuit 34a and amplifier circuit 17a. It should be noted that configurations identical to the first embodiment are denoted by reference symbols identical to the first embodiment and detailed descriptions of these configurations are omitted.

Figure 15:
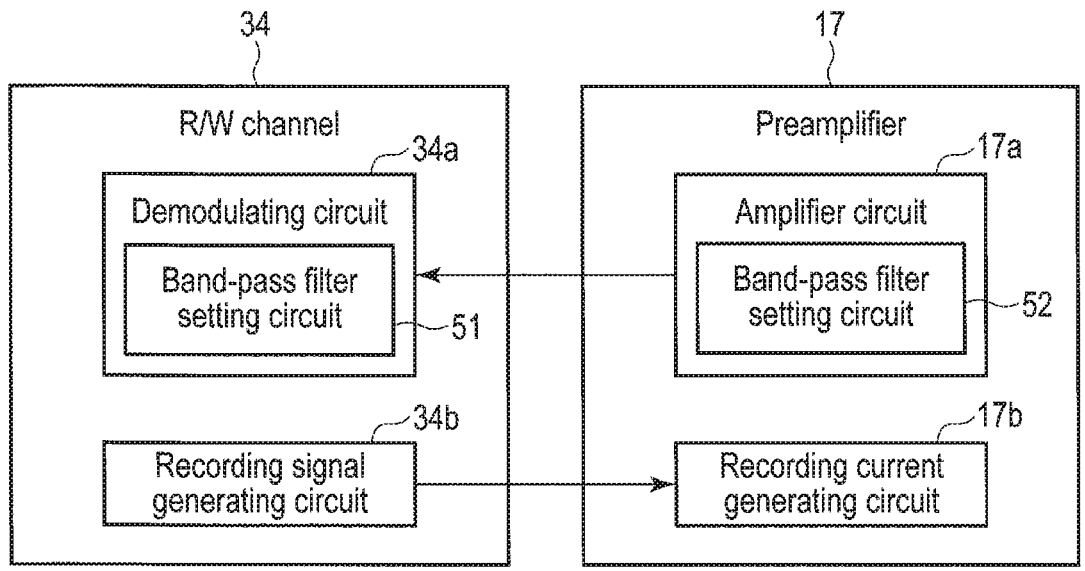
FIG. 15 is a view showing an example of the configuration of each of an R/W channel and a preamplifier according to the third embodiment.

FIG. 15 is a view schematically showing an example of the configuration of each of an R/W channel 34 and preamplifier 17. A band-pass filter setting circuit 51 is provided in the demodulating circuit 34a of the R/W channel 34, and band-pass filter setting circuit 52 is provided in the amplifier circuit 17a of the preamplifier 17. It should be noted that, in this embodiment, although a description is given of a case where both the R/W channel 34 and preamplifier 17 respectively include the band-pass filter setting circuits 51 and 52, the band-pass filter setting circuit may also be provided in one of the R/W channel 34 and preamplifier 17.

Each of the band-pass filter setting circuits 51 and 52 is configured to pass frequencies in a predetermined range through each of the circuits 51 and 52. Setting of the predetermined range can be carried out by, for example, a CPU 32. By setting of frequencies in the predetermined range, the band-pass filter setting circuits 51 and 52 become high-pass filters or low-pass filters. In this embodiment, each of the band-pass filter setting circuits 51 and 52 is configured in such a manner as to receive an instruction from the CPU 32 to assert/negate the servo gate and instruction to negate the write gate through the R/W channel 34, and become active while write of data of a write head 14 and read of data of a read head 15 are simultaneously executed (i.e., during the already-described data extension area W2).

By virtue of such a configuration, it is possible to filter a signal read by the demodulating circuit 34a and amplifier circuit 17a, and hence it is possible to remove useless noise having a possibility of being created by the simultaneous execution of write of data of the write head 14 and read of data of the read head 15, and make the read signal a read signal having a high degree of accuracy.

Fifth Embodiment

The fifth embodiment differs from the first embodiment in that a canceling circuit is provided in each of an R/W channel 34 and preamplifier 17 or in one of the R/W channel 34 and preamplifier 17. It should be noted that configurations identical to the first embodiment are denoted by reference symbols identical to the first embodiment and detailed descriptions of these configurations are omitted.

Figure 16:
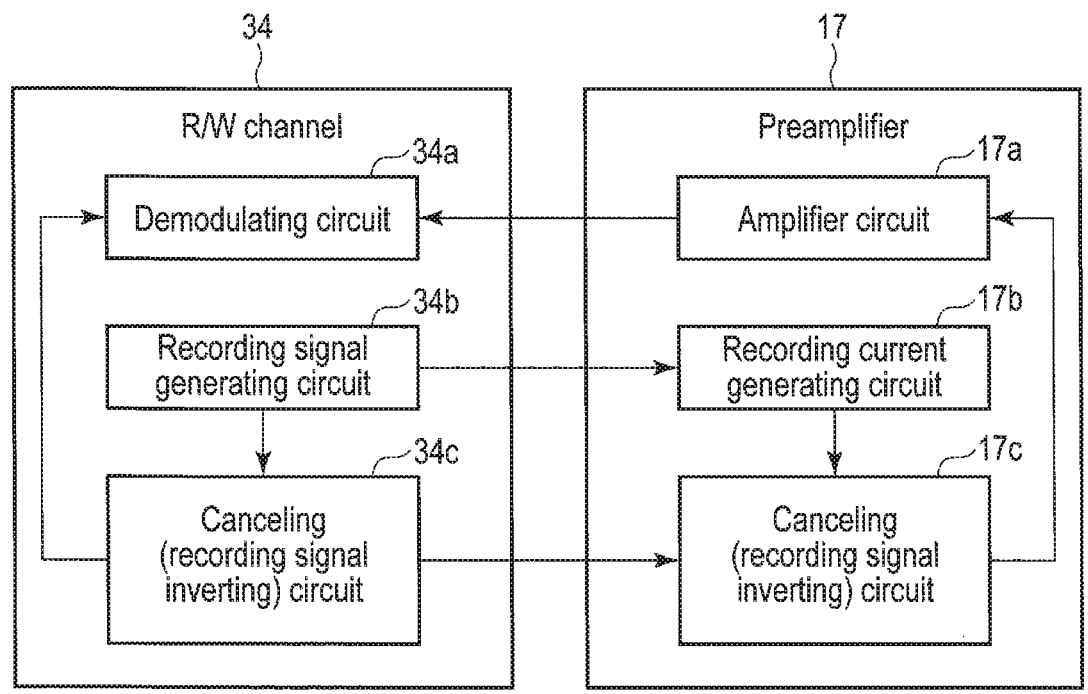
FIG. 16 is a view showing an example of the configuration of each of an R/W channel and a preamplifier according to the fourth embodiment.

FIG. 16 is a view schematically showing an example of the configuration of each of the R/W channel 34 and preamplifier 17. A canceling (recording signal inverting) circuit 34c is provided in the R/W channel 34, and canceling (recording signal inverting) circuit 17c is provided in the preamplifier 17. Further, a recording signal generating circuit 34b is configured to be able to output a signal to the canceling (recording signal inverting) circuit 34c, and canceling (recording signal inverting) circuit 34c is configured to be able to output a signal to a demodulating circuit 34a. Further, a recording current generating circuit 17b is configured to be able to output a signal to the canceling (recording signal inverting) circuit 17c, and canceling (recording signal inverting) circuit 17c is configured to be able to output a signal to an amplifier circuit 17a.

Each of the canceling (recording signal inverting) circuit 34c and canceling (recording signal inverting) circuit 17c carries out processing of canceling the waveform of write data which is a noise source on the basis of the output and frequency of the inverted waveform of write data input from an SOC 31. Thereby, it is possible to remove useless noise having a possibility of being created by the simultaneous execution of write of data of the write head 14 and read of data of the read head 15, and make the read signal a read signal having a high degree of accuracy.

Figure 17:
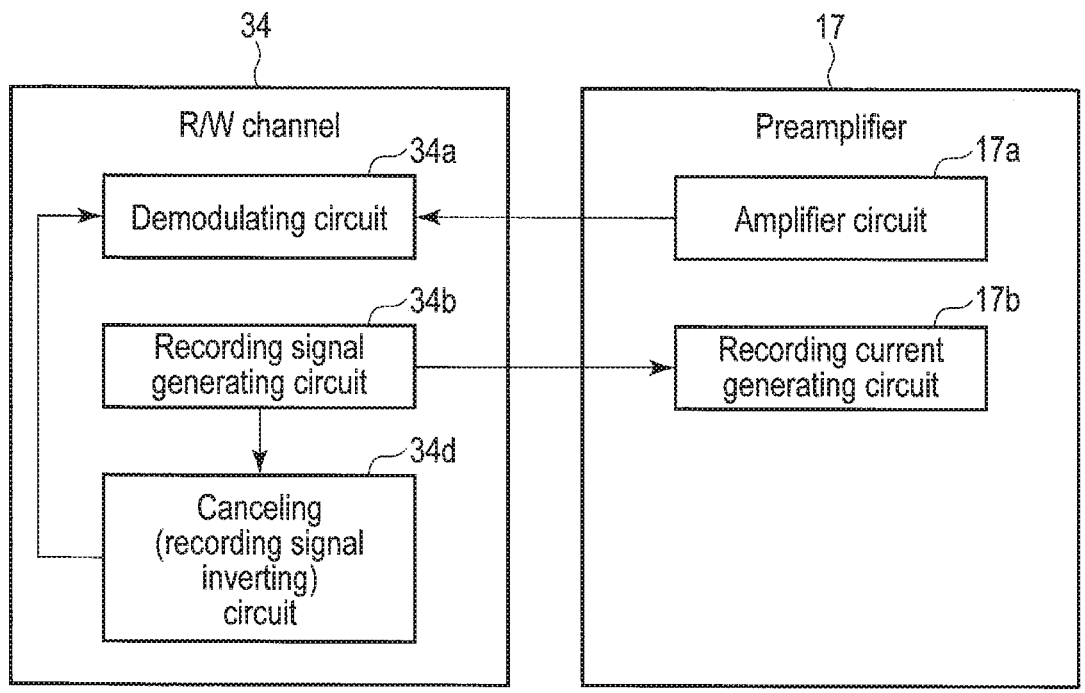
FIG. 17 is a view showing an example of the configuration of each of the R/W channel and preamplifier according to the fourth embodiment.
Figure 18:
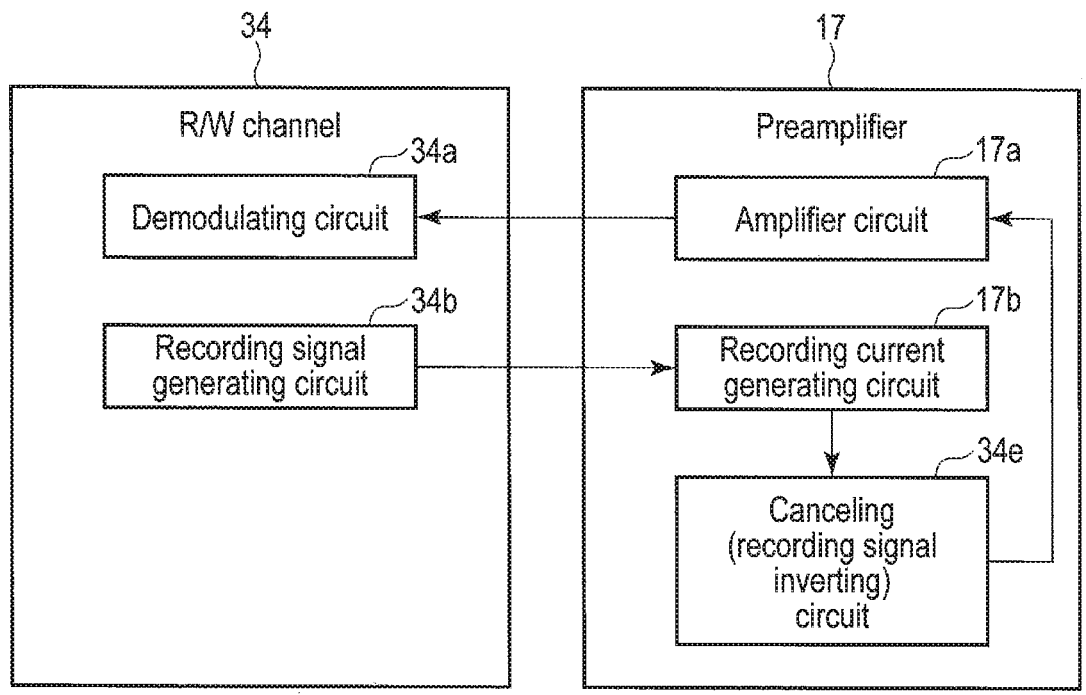
FIG. 18 is a view showing an example of the configuration of each of the R/W channel and a preamplifier according to the fourth embodiment.

Further, in FIG. 16, although the case where the canceling (recording signal inverting) circuit 34c is provided in the R/W channel 34, and canceling (recording signal inverting) circuit 17c is provided in the preamplifier 17 has been described, arrangement of the canceling circuits is not limited to the above. For example, as shown in FIG. 17, a canceling (recording signal inverting) circuit 34d may be provided in the R/W channel 34 without providing a canceling circuit in the preamplifier 17, and the canceling (recording signal inverting) circuit 34d may carry out processing of canceling the waveform of write data with respect to the demodulating circuit 34a. Further, as shown in FIG. 18, a canceling (recording signal inverting) circuit 34e is provided in the preamplifier 17 without providing a canceling circuit in the R/W channel 34, and the canceling (recording signal inverting) circuit 34e may carry out processing of canceling the waveform of write data with respect to the amplifier circuit 17a.

It should be noted that in each of the embodiments described above, although the case where the servo data D2 is read during write of data has been described, the case is not limited to this. The extension processing of a data area of each of the embodiments can be applied to even a case where data such as user data is read during write of data.

Further, there is sometimes a case where some of magnetic disk devices have a configuration in which in order to prevent write of data of the write head 14 and read of data of the read head 15 from being simultaneously executed, when the servo gate is to be asserted during generation of write data, a gate fault is set. In the case where a magnetic disk device has such a configuration, when the magnetic disk device carries out read during write of data, by stopping the control of setting the gate fault, it is made possible to simultaneously execute write of data of the write head 14 and read of data of the read head 15. For example, when the CPU 32 carries out read of data during write of data, by executing processing of stopping the control of setting a gate fault for a certain period of time from the time when the servo gate is asserted, it is made possible for the magnetic disk device to carry out read of data during write of data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk section including a magnetic disk, a magnetic head including a write head, and a read head arranged at a position separate from the write head by a predetermined distance in a rotational direction of the magnetic disk, and a preamplifier including a first circuit configured to generate a recording current used by the write head to write data to the magnetic disk, and a second circuit configured to amplify a signal reproduced from the magnetic disk by the read head; and
a control section including a processing section configured to cause the preamplifier to execute processing of generating the recording current used by the write head to write data to the magnetic disk, and processing of receiving an output reproduced from the magnetic disk by the read head, and configured to control the magnetic disk section, wherein
in the preamplifier, processing of reading data from the magnetic disk is executed by the read head in parallel with processing of writing data transferred from the control section to the magnetic disk by means of the write head, and
wherein during an assertion of the first circuit, the second circuit is asserted on the basis of an instruction from the control section, and the second circuit includes a bandpass filter circuit configured to pass frequencies in a predetermined range through the filter circuit.

2. The magnetic disk device of claim 1, wherein when read of servo data cannot be carried out, the control section retries write of the data by using servo data read last time as a criterion.

3. The magnetic disk device of claim 1, wherein the timing of asserting/negating the first circuit is adjusted on the basis of an instruction from the control section.

4. The magnetic disk device of claim 1, wherein the processing section is provided with a read/write channel including a third circuit configured to transfer a recording signal to the first circuit, and a fourth circuit configured to demodulate a reproduced waveform transferred thereto from the second circuit, and asserts the fourth circuit on the basis of an instruction from the control section during assertion of the third circuit.

5. A magnetic disk device comprising:
a magnetic disk section including a magnetic disk, a magnetic head including a write head, and a read head arranged at a position separate from the write head by a predetermined distance in a rotational direction of the magnetic disk, and a preamplifier including a first circuit configured to generate a recording current used by the write head to write data to the magnetic disk, and a second circuit configured to amplify an output reproduced from the magnetic disk by the read head;
a control section including a processing section configured to cause the preamplifier to execute processing of generating the current used by the write head to record data on the magnetic disk, and processing of receiving an output reproduced from the magnetic disk by the read head, and configured to control the magnetic disk section; and
a power save signal line connected between the preamplifier and the control section, and used to set active/power save of an output reproduced by the read head, wherein
a signal reproduced by the read head on the basis of an instruction given through the power save signal line becomes active in parallel with the processing of generating the current used to record data on the magnetic disk.

6. A magnetic disk device comprising:
a magnetic disk section including a magnetic disk, a magnetic head including a write head, and a read head arranged at a position separate from the write head by a predetermined distance in a rotational direction of the magnetic disk, and a preamplifier including a first circuit configured to generate a recording current used by the write head to write data to the magnetic disk, and a second circuit configured to amplify a signal reproduced from the magnetic disk by the read head; and
a control section including a processing section configured to cause the preamplifier to execute processing of generating the recording current used by the write head to write data to the magnetic disk, and processing of receiving an output reproduced from the magnetic disk by the read head, and configured to control the magnetic disk section wherein
in the preamplifier, processing of reading data from the magnetic disk is executed by the read head in parallel with processing of writing data transferred from the control section to the magnetic disk by means of the write head and
the preamplifier is provided with a canceling circuit configured to carrying out processing of canceling a waveform of data read on the basis of an output and a frequency of an inverted waveform of data to be written input from the control section.

7. The magnetic disk device of claim 6, wherein when read of servo data cannot be carried out, the control section retries write of the data by using servo data read last time as a criterion.

8. The magnetic disk device of claim 6, wherein during an assertion of the first circuit, the second circuit is asserted on the basis of an instruction from the control section.

9. The magnetic disk device of claim 8, wherein the timing of asserting/negating the first circuit is adjusted on the basis of an instruction from the control section.

10. The magnetic disk device of claim 6, wherein
the processing section
is provided with a read/write channel including a third circuit configured to transfer a recording signal to the first circuit, and a fourth circuit configured to demodulate a reproduced waveform transferred thereto from the second circuit and
asserts the fourth circuit on the basis of an instruction from the control section during assertion of the third circuit.

11. A magnetic disk device comprising:
a magnetic disk section including a magnetic disk, a magnetic head including a write head, and a read head arranged at a position separate from the write head by a predetermined distance in a rotational direction of the magnetic disk, and a preamplifier including a first circuit configured to generate a recording current used by the write head to write data to the magnetic disk, and a second circuit configured to amplify a signal reproduced from the magnetic disk by the read head; and
a control section including a processing section configured to cause the preamplifier to execute processing of generating the recording current used by the write head to write data to the magnetic disk, and processing of receiving an output reproduced from the magnetic disk by the read head, and configured to control the magnetic disk section, wherein
in the preamplifier, processing of reading data from the magnetic disk is executed by the read head in parallel with processing of writing data transferred from the control section to the magnetic disk by means of the write head and
the processing section is provided with a read/write channel including a third circuit configured to transfer a recording signal to the first circuit, and a fourth circuit configured to demodulate a reproduced waveform transferred thereto from the second circuit, and asserts the fourth circuit on the basis of an instruction from the control section during assertion of the third circuit.

12. The magnetic disk device of claim 11, wherein
when read of servo data cannot be carried out, the control section retries write of the data by using servo data read last time as a criterion.

13. The magnetic disk device of claim 11, wherein
during an assertion of the first circuit, the second circuit is asserted on the basis of an instruction from the control section.

14. The magnetic disk device of claim 11, wherein
the timing of asserting/negating the first circuit is adjusted on the basis of an instruction from the control section.

15. The magnetic disk device of claim 11, wherein
the second circuit includes a band-pass filter circuit configured to pass frequencies in a predetermined range through the filter circuit.

16. The magnetic disk device of claim 11, wherein
the preamplifier is provided with a canceling circuit configured to carrying out processing of canceling a waveform of data read on the basis of an output and a frequency of an inverted waveform of data to be written input from the control section.

* * * * *